US010724610B2

(12) United States Patent
Mellet et al.

(10) Patent No.: US 10,724,610 B2
(45) Date of Patent: Jul. 28, 2020

(54) HYBRID POWERTRAIN

(71) Applicant: GM Global Technology Operations LLC, Detroit, MI (US)

(72) Inventors: Edward W. Mellet, Rochester Hills, MI (US); Alan G. Holmes, Clarkson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/216,404

(22) Filed: Dec. 11, 2018

(65) Prior Publication Data

US 2020/0182333 A1    Jun. 11, 2020

(51) Int. Cl.
*F16H 3/62* (2006.01)
*F16H 3/72* (2006.01)

(52) U.S. Cl.
CPC ............ *F16H 3/724* (2013.01); *F16H 3/62* (2013.01); *F16H 2200/0021* (2013.01); *F16H 2200/0069* (2013.01); *F16H 2200/0078* (2013.01); *F16H 2200/2015* (2013.01); *F16H 2200/2048* (2013.01)

(58) Field of Classification Search
CPC .... F16H 3/724; F16H 3/62; F16H 2200/2048; F16H 2200/0069; F16H 2200/0021; F16H 2200/2015; F16H 2200/0078
See application file for complete search history.

(56) References Cited

U.S. PATENT DOCUMENTS

| | | | |
|---|---|---|---|
| 5,558,595 A | 9/1996 | Schmidt et al. | |
| 5,931,757 A | 8/1999 | Schmidt | |
| 6,478,705 B1 | 11/2002 | Holmes et al. | |
| 6,527,658 B2 | 3/2003 | Holmes et al. | |
| 6,569,054 B2 | 5/2003 | Kato | |
| 6,634,980 B1 * | 10/2003 | Ziemer | F16H 3/66 475/275 |
| 6,962,545 B2 | 11/2005 | Larkin | |
| 7,621,840 B2 | 11/2009 | Kamm et al. | |
| 7,699,741 B2 | 4/2010 | Hart et al. | |
| 7,704,180 B2 | 4/2010 | Wittkopp et al. | |
| 7,736,260 B2 | 6/2010 | Hart et al. | |
| 7,824,299 B2 | 11/2010 | Hart et al. | |
| 7,828,096 B2 | 11/2010 | Hoher et al. | |
| 7,828,691 B2 | 11/2010 | Phillips et al. | |

(Continued)

*Primary Examiner* — David J Hlavka
(74) *Attorney, Agent, or Firm* — Quinn IP Law

(57) ABSTRACT

A hybrid powertrain includes an internal combustion engine and a multi-speed transmission coupled to the internal combustion engine. The multi-speed transmission includes an input member, an output member, and a first, second, third, fourth, and fifth planetary gear set each having a sun gear member, a planet carrier assembly member and a ring gear member. The multi-speed transmission further includes a first, second, third, fourth, and fifth planetary gear sets each having a sun gear member, a planet carrier assembly member and a ring gear member. The multi-speed transmission further includes seven torque-transmitting devices configured to selectively interconnect the first, second, third, fourth, and fifth planetary gear sets with one another in combinations of at least four to establish at least ten forward speed ratios and at least one reverse speed ratio between the input member and the output member.

20 Claims, 4 Drawing Sheets

(56) References Cited

U.S. PATENT DOCUMENTS

| | | | |
|---|---|---|---|
| 7,887,457 B2 | 2/2011 | Wittkopp et al. | |
| 8,152,682 B2 | 4/2012 | Swales et al. | |
| 8,795,132 B2* | 8/2014 | Tabata | B60K 6/445 477/5 |
| 8,801,558 B2* | 8/2014 | Van Druten | B60K 6/365 475/5 |
| 2010/0203995 A1* | 8/2010 | Zhang | B60K 6/365 475/5 |
| 2010/0248893 A1* | 9/2010 | Shimanaka | B60K 6/48 477/5 |
| 2011/0005215 A1* | 1/2011 | Ota | B60K 6/365 60/341 |
| 2011/0230299 A1* | 9/2011 | Kraynev | F16H 37/042 475/219 |
| 2013/0109525 A1* | 5/2013 | Van Druten | B60K 6/365 475/5 |
| 2015/0141191 A1* | 5/2015 | Zhang | F16H 3/54 475/151 |

* cited by examiner

| Gear | Gear Ratio | BRAKE1 Clutch Ground R1 | CLUTCH1 Clutch R2 J5 | CLUTCH2 Clutch J5 PC3 | CLUTCH3 Clutch PC2 R3 | CLUTCH4 Clutch PC1 J5 | CLUTCH5 Clutch Input-E PC2 | CLUTCH6 Clutch Input-M S6 | CLUTCH7 Clutch Ground R1 | ICE | EV | Hybrid | EMLD | |
|---|---|---|---|---|---|---|---|---|---|---|---|---|---|---|
| REV1 | -15.474 | X |  | X |  | X | X | X |  |  |  | X |  | |
| REV2 | -4.866 | X |  | X |  | X | X |  | C |  |  |  | X | |
| 1ST | 9.679 | X | X | X |  | X |  |  |  |  | X |  |  | |
| 1ST | 9.679 | X | X | X |  | X |  | X |  | X |  | X |  | |
| 2ND | 8.958 | X |  | X | X | X |  |  |  |  | X |  |  | |
| 2ND | 8.958 | X |  | X | X | X |  | X |  | X |  | X |  | |
| 3RD | 8.317 | X | X |  | X | X |  |  |  |  | X |  |  | |
| 3RD | 8.317 | X | X |  | X | X |  | X |  | X |  | X |  | E |
| 4TH | 6.677 | X | X | X | X |  |  |  |  |  | X |  |  | |
| 4TH | 6.677 | X | X | X | X |  |  | X |  | X |  | X |  | |
| 5TH | 4.696 | X |  |  | X | X | X |  | C |  |  |  | X | E |
| 5TH | 4.696 | X |  | X | X |  | X |  | C |  |  |  | X | |
| 5TH | 4.696 | X | X |  | X |  | X |  | C |  |  |  | X | E |
| 6TH | 3.398 | X |  | X | X |  | X | X |  | X |  | X |  | |
| 6TH | 3.398 | X |  |  | X | X | X | X |  | X |  | X |  | |
| 6TH | 3.398 | X | X |  |  | X | X | X |  | X |  | X |  | E |
| 7TH | 3.111 |  | X | X | X | X |  |  |  |  | X |  |  | |
| 7TH | 3.111 |  | X | X | X | X |  | X |  | X |  | X |  | |
| 8TH | 2.985 | X | X | X |  |  | X |  | C |  |  |  | X | |
| 9TH | 2.652 | X | X | X |  |  | X | X |  | X |  | X |  | |
| 10TH | 2.146 | X | X | X | X |  | X |  |  |  |  | X |  | |
| 11TH | 1.769 | X | X |  |  | X | X |  |  |  |  | X |  | |
| 12TH | 1.520 | X | X |  | X | X | X |  |  |  |  | X |  | E |
| 13TH | 1.275 | X |  | X | X | X | X |  |  |  |  | X |  | |
| 14TH | 1.000 |  | X | X | X | X | X |  |  |  |  | X |  | |
| 15TH | 0.896 |  |  | X | X | X | X | X |  | X |  | X |  | |
| 16TH | 0.854 |  |  | X | X | X | X |  | C |  |  |  | X | |
| 17TH | 0.766 |  | X |  | X | X | X | X |  | X |  | X |  | E |
| 18TH | 0.720 |  | X | X |  | X | X | X |  | X |  | X |  | |
| 19TH | 0.669 |  | X |  | X | X | X |  | C |  |  |  | X | E |
| 20TH | 0.636 |  | X | X |  | X | X |  | C |  |  |  | X | |

FIG. 2

HYBRID POWERTRAIN

INTRODUCTION

The present disclosure relates to a hybrid powertrain having a drive motor and a transmission configured to provide twenty forward speed ratios and two reverse speed ratios in a hybrid transmission architecture.

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power.

The wide variation in the demands that vehicles place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission delivers mechanical power from an internal combustion engine to the remainder of a drive system, such as fixed final drive gearing, axles and wheels. A mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection allows power from the engine to be delivered to the rest of the drive system with a ratio of torque multiplication and speed reduction, with a ratio of torque reduction and speed multiplication known as overdrive, or with a reverse ratio.

Hybrid systems may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by a motor acting as a generator during periods when the engine is operating is utilized during these engine-off periods. Transient demand for engine torque or power is supplemented by the motor during operation in engine-on, electric modes, allowing for downsizing the engine without reducing apparent vehicle performance. Additionally, the engine may be operated at or near the optimal efficiency point for a given power demand. The motor-generator is able to capture vehicle kinetic energy during braking, which is used to keep the engine off longer, supplement engine torque or power and/or operate at a lower engine speed, or supplement accessory power supplies. Additionally, the motor/generator is very efficient in accessory power generation and electric power from the battery serves as an available torque reserve allowing operation at a relatively low transmission numerical speed ratio.

SUMMARY

The present disclosure describes a hybrid arrangement a for rear-wheel drive transmission with at least ten-speed ratios. The presently disclosed hybrid powertrain enables a high launch ratio to reduce motor torque requirements. The high launch ratio may be used for low-battery friction launch. The electric motor launch device (EMLD) launch ratios are available as well, but with less launch ratio. The hybrid powertrain includes an internal combustion engine and a multi-speed transmission coupled to the internal combustion engine. The multi-speed transmission includes an input member, an output member, and first, second, third, fourth, and fifth planetary gear sets each having a sun gear member, a planet carrier assembly member and a ring gear member. The multi-speed transmission further includes a first interconnecting member continuously connects the sun gear member of the first planetary gear set with the sun gear member of the second planetary gear set. Further, the multi-speed transmission includes a second interconnecting member continuously connecting the planet carrier assembly member of the first planetary gear set with the ring gear member of the fourth planetary gear set. Also, the multi-speed transmission includes a third interconnecting member continuously connecting the ring gear member of the second planetary gear set with the sun gear member of the third planetary gear set. The multi-speed transmission further includes a fourth interconnecting member continuously connecting the planet carrier assembly member of the fifth planetary gear set with the sun gear member of the first planetary gear set. The multi-speed transmission further includes seven torque-transmitting devices configured to selectively interconnect the first, second, third, fourth, and fifth planetary gear sets with one another in combinations of at least four to establish at least ten forward speed ratios and at least one reverse speed ratio between the input member and the output member. The hybrid powertrain further includes a final drive mechanism continuously connected to the planet carrier assembly member of the fourth planetary gear set. The hybrid powertrain includes an electric motor-generator connected to the multi-speed transmission.

In one aspect of the present disclosure, an arrangement to be used which connects an internal combustion engine and a transmission includes: a planetary gearset with a fixed ring gear. The sun gear is fixed to an electric motor. The carrier of gearset is connected to a member of the transmission. The transmission is shown as an embodiment of this, but this may be used on other transmissions. The internal combustion engine is connected by a clutch to the electric motor and sun gear. The internal combustion engine is also connected by another clutch to a different location within the transmission. The transmission is shown as an embodiment of this, but this arrangement may be used on other transmissions. There may additionally be a clutch to ground the fifth gearset, thereby requiring no energy from the motor. The arrangement further comprising a plurality of interconnecting members, and at least one of the plurality of interconnecting members is connected to the planetary gear set.

In one aspect of the disclosure, the hybrid powertrain further comprising a fifth interconnecting member continuously connecting the electric motor-generator to the sun gear member of the fifth planetary gear set. Further, the hybrid powertrain includes a transmission housing. A first one of the seven torque-transmission devices may selectively connect the ring gear member of the first planetary gear set with the transmission housing. A second one of the seven torque-transmitting devices may selectively connect the second ring gear member of the second planetary gear set with a J-node. A third one of the seven torque-transmitting devices may selectively connect the planet carrier assembly member of the third planetary gear set with the J-node. The third torque-transmitting device may be replaced with a fixed connection. As such, in this embodiment, the planetary gear arrangement includes a sixth interconnecting member (e.g., a sixth interconnection shaft) continuously connecting the third planet carrier assembly member of the third planetary gear set with the J-node. A fourth one of the seven torque-transmitting devices may selectively connect the ring gear member of the third planetary gear set with the planet carrier assembly member of the second planetary gear set. A fifth one of the seven torque-transmitting devices may selectively connect the planet carrier assembly member of the first planetary gear set with the J-node. The sixth one of the torque-transmitting devices selectively connects an engine crankshaft of the internal combustion engine with the second planet carrier assembly member of the second planetary gear set. A seventh one of the torque-transmitting devices may selectively connect the electric motor-generator and the sun gear member of the first planetary gear set to the engine crankshaft of the internal combustion engine. An eighth one of the torque-transmitting devices may selectively connect either the sun gear member or the planet carrier assembly of the fifth planetary gear set with the stationary component to selectively ground the electric motor-generator.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a truth table and chart depicting some of the operating characteristics of the powertrain shown in FIG. 1.

DETAILED DESCRIPTION

Figure 1:
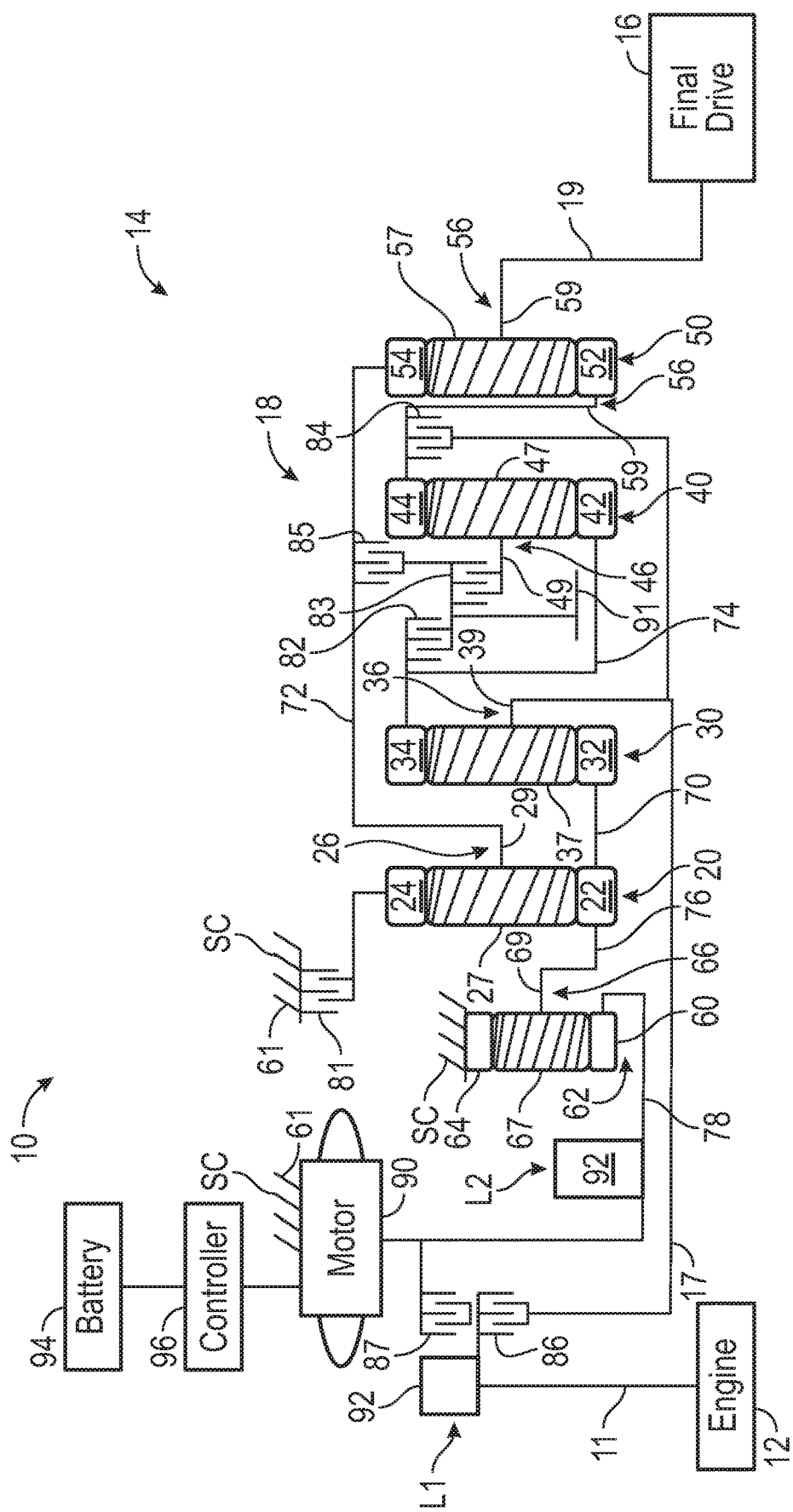
FIG. 1 is a schematic representation of a powertrain including planetary transmission gear sets and torque-transmitting devices.

Referring to the drawings, there is shown in FIG. 1, a hybrid powertrain 10 having an internal combustion engine 12, a multi-speed transmission 14, a final drive mechanism 16, an electric motor-generator 90 connected with the multi-speed transmission 14, and a mechanical pump 92 connected with the multi-speed transmission 14. The electric motor generator 90 is grounded (i.e., coupled to a stationary component SC, such as a transmission housing 61). The engine 12 may be powered using various types of fuel to improve the efficiency and fuel economy of a particular application. Such fuels may include, for example, gasoline; diesel; ethanol; dimethyl ether; etc. The mechanical pump 92 may be disposed at a first location L1 or a second location L2 and may be driven by: 1) the internal combustion engine 12; 2) the electric motor-generator 90; or a combination of both (whichever is rotating faster). The hybrid powertrain 10 does not include a torque converter.

The multi-speed transmission 14 includes an input member 17 (i.e., input shaft), a planetary gear arrangement 18, and an output member 19 continuously connected with the final drive mechanism 16. The planetary gear arrangement 18 includes five planetary gear sets (i.e., a first planetary gear set 20, a second planetary gear set 30, a third planetary gear set 40, a fourth planetary gear set 50, and fifth planetary gear sets 60).

The arrangement 18 to be used which connects the internal combustion engine 12 and a transmission 14 includes: a planetary gearset 60 with a fixed ring gear 64. The sun gear 62 is fixed to an electric motor 90. The carrier of the gearset 60 is connected to a member of the transmission 18. The transmission 18 is shown as an embodiment of this, but this may be used on other transmissions. The internal combustion engine 12 is connected by the clutch 87 to the electric motor 90 and sun gear 62. The internal combustion engine 12 is also connected by the clutch 86 to a different location within the transmission. The transmission 18 is shown as an embodiment of this, but this arrangement may be used on other transmissions. There may additionally be a clutch to ground the fifth gearset, thereby requiring no energy from the motor 90.

The first planetary gear set 20 includes a first sun gear member 22, a first ring gear member 24, and a first planet carrier assembly member 26. The first planet carrier assembly member 26 includes a plurality of first pinion gears 27 rotatably mounted on a first carrier member 29 and disposed in meshing relationship with both the first sun gear member 22 and the first ring gear member 24.

The second planetary gear set 30 includes a second sun gear member 32, a second ring gear member 34, and a second planet carrier assembly member 36. The second planet carrier assembly member 36 includes a plurality of second pinion gears 37 rotatably mounted on a second carrier member 39 and disposed in meshing relationship with both the second ring gear member 34 and the second sun gear member 32.

The third planetary gear set 40 includes a third sun gear member 42, a third ring gear member 44, and a third planet carrier assembly member 46. The third planet carrier assembly member 46 includes a plurality of third pinion gears 47 mounted on a third carrier member 49 and disposed in meshing relationship with both the third ring gear member 44 and the third sun gear member 42.

The fourth planetary gear set 50 includes a fourth sun gear member 52, a fourth ring gear member 54, and a fourth planet carrier assembly member 56. The fourth planet carrier assembly member 56 includes a plurality of fourth pinion gears 57 mounted on a carrier member 59 and disposed in meshing relationship with both the fourth ring gear member 54 and the fourth sun gear member 52.

The fifth planetary gear set 60 includes a fifth sun gear member 62, a fifth ring gear member 64, and a fifth planet carrier assembly member 66. The fifth planet carrier assembly member 66 includes a plurality of fifth pinion gears 67 mounted on a carrier member 69 and disposed in meshing relationship with both the fifth ring gear member 64 and the fifth sun gear member 62. The fifth ring gear member 64 is grounded. That is, the fifth ring gear member 64 is attached to the stationary component SC (e.g., the transmission housing 61). As such, the fifth ring gear member 64 remains stationary relative to the other members of the fifth planetary gear set 60. The fifth planetary gear set 60 provides a high launch ratio for the electric motor-generator 90, thereby reducing the torque requirement for the electric motor-generator 90.

The input member 17 (i.e., input shaft) is continuously connected with the second planet carrier assembly member 36 of the second planetary gear set 30. The output member 19 is continuously connected with the fourth planet carrier assembly member 56 of the fourth planetary gear set 50.

A first interconnecting member 70 (e.g., a first interconnecting shaft) continuously connects the first sun gear member 22 of the first planetary gear set 20 with the second sun gear member 32 of the second planetary gear set 30. A second interconnecting member 72 (e.g., a second interconnecting shaft) continuously connects the first planet carrier assembly member 26 of the first planetary gear set 20 with the fourth ring gear member 54 of the fourth planetary gear set 50. A third interconnecting member 74 (e.g., a third interconnecting shaft) continuously connects the second ring gear member 34 of the second planetary gear set 30 with the third sun gear member 42 of the third planetary gear set 40. A fourth interconnecting member 76 (e.g., a fourth interconnecting shaft) continuously connects the fifth planet carrier assembly member 66 of the fifth planetary gear set 60 with the first sun gear member 22 of the first planetary gear set 20. A fifth interconnecting member 78 (e.g., a fifth interconnection shaft) continuously connects the electric motor-generator 90 to the fifth sun gear member 62 of the fifth planetary gear set 60.

The planetary gear arrangement 18 also includes at least seven torque-transmitting devices (e.g., a first torque-transmitting device 81, second torque-transmitting device 82, third torque-transmitting device 83, fourth torque-transmitting device 84, fifth torque-transmitting device 85, sixth torque-transmitting device 86, and a seventh torque-transmitting device 87) each having an engaged or ON position to transmit torque and a disengaged or OFF position, in which no torque is transmitted. The torque-transmitting devices configured to selectively interconnect the members of the planetary gear sets with the stationary component SC, or with members of other planetary gear sets. The seven torque-transmitting devices (or more) are engaged in combinations of at least four to establish at least ten forward speed ratios and at least one reverse speed ratio between said input member 17 and said output member 19.

With reference to FIGS. 1 and 2, the first torque-transmitting device 81, such as brake and referred in FIG. 2 as BRAKE1, selectively connects the first ring gear member 24 (referred to as R1 in FIG. 2) of the first planetary gear set 20 with the stationary component, such as the transmission housing 61 (referred to as Ground in FIG. 2). The first torque-transmitting device 81 is a stationary-type torque-transmitting device, commonly termed brakes or reaction clutches.

The second torque-transmitting device 82, such as a clutch and referred to in FIG. 2 as CLUTCH1, selectively connects the second ring gear member 34 (referred to as R2 in FIG. 2) of the second planetary gear set 30 with a J-node 91 (i.e., a free-rolling node and referred to as J5 in FIG. 2). The term "J-node" means a component of the planetary gear arrangement 18 that is not connected to any gears, only rotating clutches. The second torque-transmitting device 82 is a rotating-type torque-transmitting device, commonly termed clutch.

The third torque-transmitting device 83, such as clutch and referred to in FIG. 2 as CLUTCH2, selectively connects the third planet carrier assembly member 46 (referred to as PC3 in FIG. 2) of the third planetary gear set 40 with J-node 91 (referred to as J5 in FIG. 2). The third torque-transmitting device 83 also selectively connects the first planet carrier assembly member 26 of the first planetary gear set 20 with the third planet carrier assembly member 46 of the third planetary gear set 40 when the fifth torque-transmitting device 85 is in the engaged position. The third torque-transmitting device 83 is a rotating-type torque-transmitting device, commonly termed clutch.

The fourth torque-transmitting device 84, such as a clutch and referred to in FIG. 2 as CLUTCH3, selectively connects the third ring gear member 44 (referred to as R3 in FIG. 2) of the third planetary gear set 40 with the second planet carrier assembly member 36 (referred to as PC2 in FIG. 2) of the second planetary gear set 30. The fourth torque-transmitting device 84 is a rotating-type torque-transmitting device, commonly termed clutch.

The fifth torque-transmitting device 85, such as a clutch and referred to in FIG. 2 as CLUTCH4, selectively connects the first planet carrier assembly member 26 (referred to as PC1 in FIG. 2) of the first planetary gear set 20 with the J-node 91 (referred to as J5 in FIG. 2). The fifth torque-transmitting device 85 is a rotating-type torque-transmitting device, commonly termed clutch.

The sixth torque-transmitting device 86, such a clutch and referred to in FIG. 2 as CLUTCH5, selectively connects an engine crankshaft 11 (referred to as Input-E in FIG. 2) of the internal combustion engine 12 with the second planet carrier assembly member 36 (referred to in FIG. 2 as PC2) of the second planetary gear set 30 to operate the vehicle in a hybrid mode (Hybrid in FIG. 2), an engine mode (ICE in FIG. 2) or an electric motor launch device (EMLD) mode. In the engine mode (ICE), the powertrain 10 uses solely the internal combustion engine 12 to provide input torque to the multi-speed transmission 14. The sixth torque-transmitting device 86 is a rotating-type torque-transmitting device, commonly termed clutch.

In the electric mode (EV), the powertrain 10 uses solely the electric motor-generator 90 to provide the input torque to the multi-speed transmission 14. In the hybrid mode, the powertrain 10 uses both the internal combustion engine 12 and the electric motor-generator 90 to provide input torque to the multi-speed transmission 14 and the speeds of the internal combustion engine 12 and the electric motor-generator 90 are equal to each other. In the EMLD mode, the powertrain 10 uses both the internal combustion engine 12 and the electric motor-generator 90 to provide input torque to the multi-speed transmission 14 and the speeds of the internal combustion engine 12 and the electric motor-generator 90 are different from each other. In FIG. 2, the speed ratios are shown with the motor speed being equal to 0 revolutions per minutes (RPMs).

The seventh torque-transmitting device 87, such as a clutch as referred to in FIG. 2 as CLUTCH6, selectively connects the electric motor-generator 90 (referred to as Input-M in FIG. 2) and the fifth sun gear member 62 (referred to as S6 in FIG. 2) of the fifth planetary gear set 60 to the engine crankshaft 11 of the internal combustion engine 12 to operate in the hybrid mode (Hybrid in FIG. 2). The seventh torque-transmitting device 87 is a rotating-type torque-transmitting device, commonly termed clutch. Because the powertrain 10 includes the sixth torque-transmitting device 86 and the seventh torque-transmitting device 87, it does not need (and therefore does not include) a torque converter.

An electric power source 94 is electrically connected to the electric motor-generator 90. As such, the electric motor-generator 90 may transfer power to or receive power from the electric power source 94. The electric power source 94 may be one or more batteries. Other electric power sources 94 such as fuel cells, have the ability to provide, or store and dispense, electric power and may be used in place of batteries.

A controller 96 is connected to the electric power source to control the distribution of power from or to the power source. The controller 96 may include hardware elements such as a processor (P), circuitry including but not limited to a timer, oscillator, analog-to-digital (A/D) circuitry, digital-to-analog (D/A) circuitry, a digital signal processor, and input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random-access memory (RAM), electrically-erasable programmable read-only memory (EEPROM), and the like.

Returning now to the description of the power sources, it should be apparent from the foregoing description, and with particular reference to FIG. 1, that the multi-speed transmission 14 selectively receives power from the engine 12. The multi-speed transmission 14 also receives power from an electric power source 94, which is connected to the controller 96. The electric power source 94 may be one or more batteries. Other electric power sources 94, such as capacitors or fuel cells, that have the ability to provide, or store, and dispense electric power may be used in place of or in combination with batteries. The speed ratio between the engine crankshaft 11 and the output member 19 is prescribed by the state of the torque-transmitting devices (i.e., a first torque-transmitting device 81, second torque-transmitting device 82, third torque-transmitting device 83, fourth torque-transmitting device 84, fifth torque-transmitting device 85, sixth torque-transmitting device 86, and a seventh torque-transmitting device 87) and the ring gear/sun gear tooth ratios of the planetary gear sets (i.e., a first planetary gear set 20, a second planetary gear set 30, a third planetary gear set 40, a fourth planetary gear set 50, and fifth planetary gear sets 60).

As shown in FIG. 2, and in particular the truth table disclosed therein, the torque-transmitting devices (i.e., a first torque-transmitting device 81, second torque-transmitting device 82, third torque-transmitting device 83, fourth torque-transmitting device 84, fifth torque-transmitting device 85, sixth torque-transmitting device 86, and a seventh torque-transmitting device 87) are selectively engaged in combinations of at least four to provide at least twenty forward speed ratios and at least one reverse speed ratio (e.g., two), all with single transition sequential shifts. In FIG. 2, the X in the table means that the torque-transmission device is in the engaged or On position, thereby carrying torque. Otherwise, if no X is shown in FIG. 2, the torque-transmitting device is in the disengaged or Off position and does not carry torque. The unique arrangement of the multi-speed transmission 14 improves packaging by minimizing the length of the multi-speed transmission 14.

Figure 3:
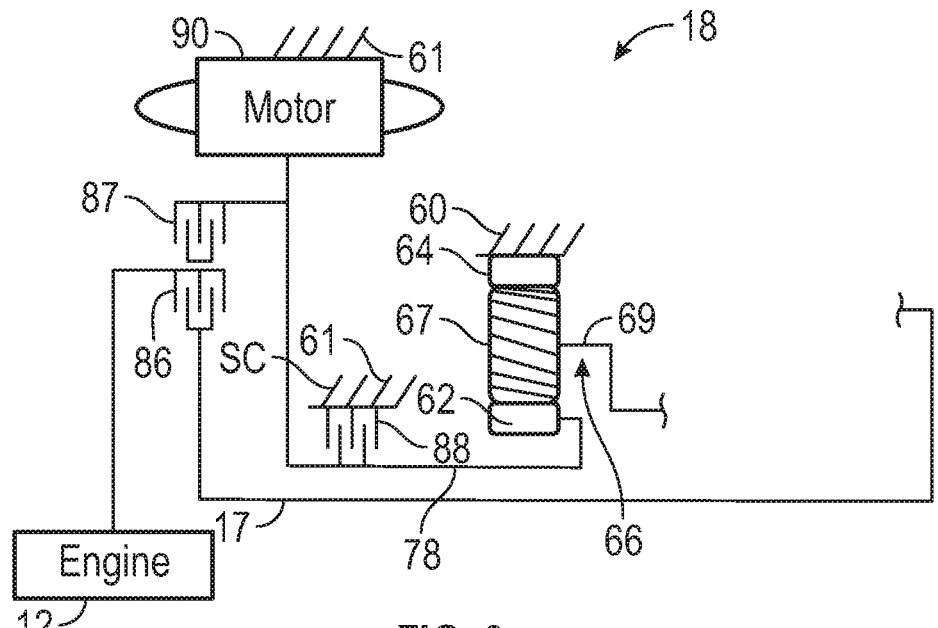
FIG. 3 is a schematic representation of a powertrain in accordance with another aspect of the present disclosure.

With reference to FIG. 3, the planetary gear arrangement 18 may further include an eighth torque-transmitting device 88, such as a brake, selectively connecting fifth sun gear member 62 of the fifth planetary gear set 60 with the stationary component SC (e.g., the transmission housing 61) to selectively ground the electric motor-generator 90, thereby providing the multi-speed transmission 14 with ten speed ratios. The eighth torque-transmitting device 88 is a stationary-type torque-transmitting device, commonly termed brakes or reaction clutches.

Figure 4:
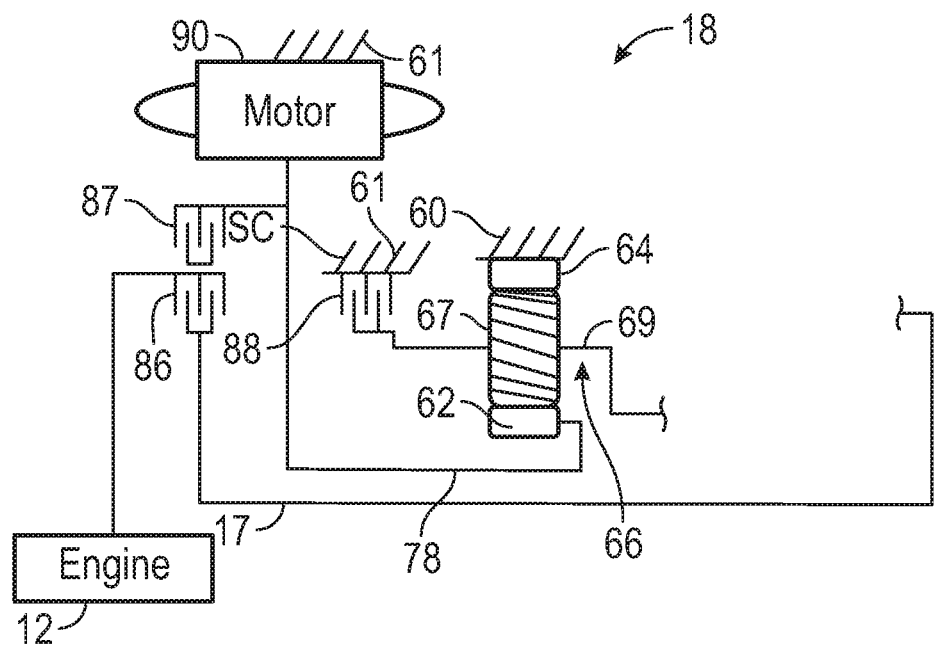
FIG. 4 is a schematic representation of a powertrain in accordance with another aspect of the present disclosure.

Alternatively, as shown in FIG. 4, the eighth torque-transmitting device 88 selectively connects the fifth ring gear member 24 (referred to as R1 in FIG. 2) of the fifth planetary gear set 60 with the stationary component (e.g., transmission housing 61) to selectively ground the electric motor-generator 90, thereby providing the multi-speed transmission 14 with ten speed ratios.

Figure 5:
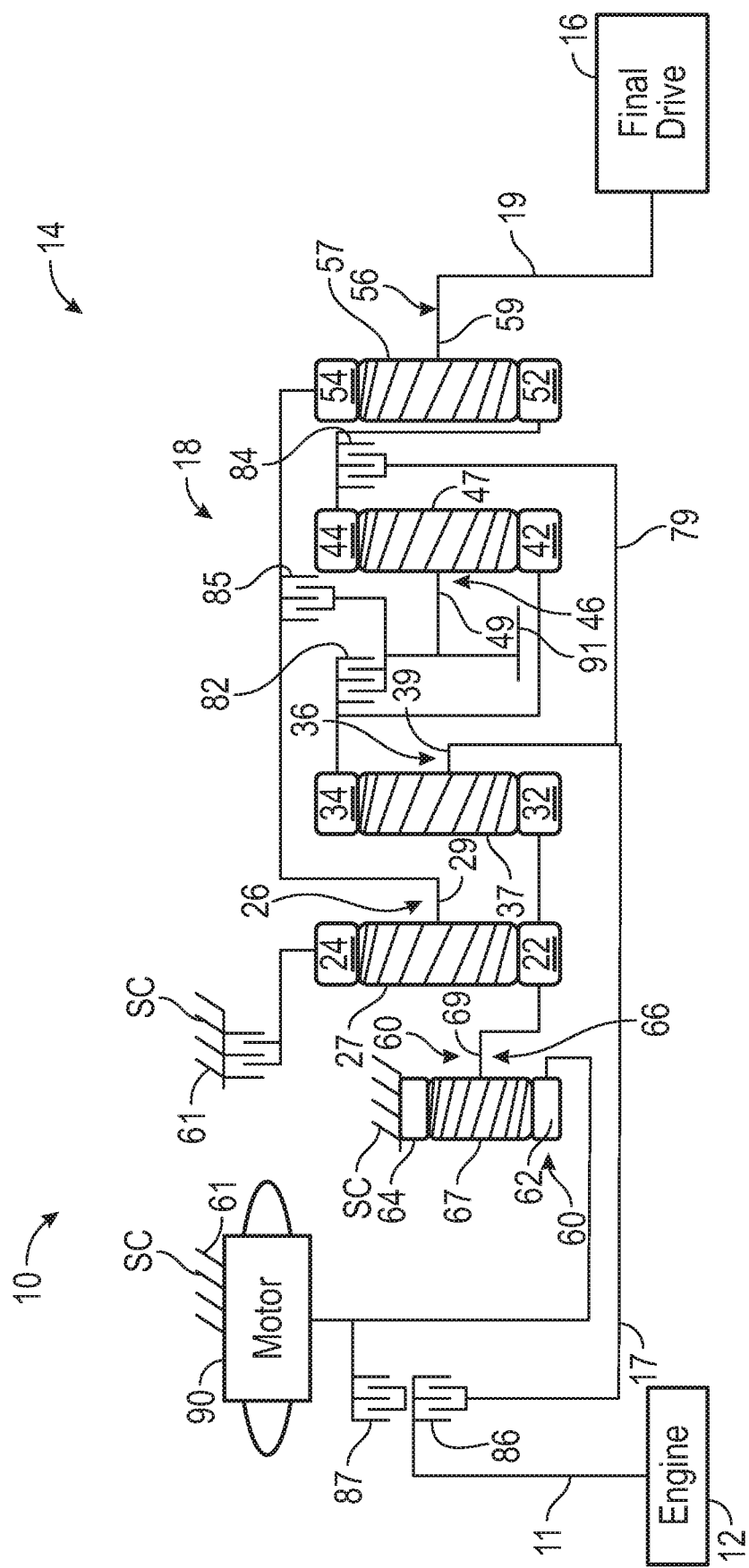
FIG. 5 is a schematic representation of a powertrain in accordance with another aspect of the present disclosure.

With reference to FIG. 5, the third torque-transmitting device 83 may be replaced with a fixed connection. As such, in this embodiment, the planetary gear arrangement 18 includes a sixth interconnection member 79 (e.g., a sixth interconnection shaft) continuously connecting the third planet carrier assembly member 46 (referred to as PC3 in FIG. 2) of the third planetary gear set 40 with J-node 91 (referred to as J5 in FIG. 2). As a consequence, the speed ratios E are eliminated as shown in FIG. 2.

While the best modes for carrying out the disclosure have been described in detail, those familiar with the art to which this disclosure relates will recognize various alternative designs and embodiments for practicing the disclosure within the scope of the appended claims.

What is claimed is:

1. An arrangement to be used which connects an internal combustion engine and a transmission, the arrangement comprising:
   a first planetary gear set, a second planetary gear set, a third planetary gear set, a fourth planetary gear set, and a fifth planetary gear set each having a sun gear member, a carrier member and a ring gear member, wherein the first planetary gear set, the second planetary gear set, the third planetary gear set, the fourth planetary gear set, and the fifth planetary gear set are coupled to each other, the sun gear of the fifth planetary gear set is fixed to an electric motor, and the carrier member of the fifth planetary gear set is connected to a member of the transmission;
   wherein the internal combustion engine is connected by a clutch to the electric motor and the sun gear; and
   wherein the internal combustion engine is also connected by another clutch to a different location within the transmission.

2. The arrangement of claim 1, further comprising a first interconnecting member and a second interconnecting member, wherein the first interconnecting member continuously connects the sun gear member of the first planetary gear set with the sun gear member of the second planetary gear set, and the second interconnecting member continuously connects the carrier member of the first planetary gear set with the ring gear member of the fourth planetary gear set.

3. The arrangement of claim 2, further comprising a third interconnecting member and a fourth interconnecting member, wherein the third interconnecting member continuously connects the ring gear member of the second planetary gear set with the sun gear member of the third planetary gear set, and the fourth interconnecting member continuously connects the carrier member of the fifth planetary gear set with the sun gear member of the first planetary gear.

4. A hybrid powertrain comprising:
   an internal combustion engine;
   a multi-speed transmission having:
      an input member;
      an output member;
      a first planetary gear set, a second planetary gear set, a third planetary gear set, a fourth planetary gear set, and a fifth planetary gear set each having a sun gear member, a planet carrier assembly member and a ring gear member;
      a first interconnecting member continuously connects the sun gear member of the first planetary gear set with the sun gear member of the second planetary gear set;
      a second interconnecting member continuously connecting the planet carrier assembly member of the first planetary gear set with the ring gear member of the fourth planetary gear set;

a third interconnecting member continuously connecting the ring gear member of the second planetary gear set with the sun gear member of the third planetary gear set;

a fourth interconnecting member continuously connecting the planet carrier assembly member of the fifth planetary gear set with the sun gear member of the first planetary gear set;

seven torque-transmitting devices configured to selectively interconnect the first planetary gear set, the second planetary gear set, the third planetary gear set, the fourth planetary gear set, and the fifth planetary gear set with one another in combinations of at least four to establish at least ten forward speed ratios and at least one reverse speed ratio between the input member and the output member; and an electric motor-generator connected to the multi-speed transmission.

5. The hybrid powertrain of claim 4, further comprising a fifth interconnecting member continuously connecting the electric motor-generator to the sun gear member of the fifth planetary gear set.

6. The hybrid powertrain of claim 5, further comprising a transmission housing, wherein a first one of the seven torque-transmitting devices selectively connects the ring gear member of the first planetary gear set with the transmission housing.

7. The hybrid powertrain of claim 6, wherein a second one of the seven torque-transmitting devices selectively connects the ring gear member of the second planetary gear set with a J-node.

8. The hybrid powertrain of claim 7, wherein a third one of the seven torque-transmitting devices selectively connects the planet carrier assembly member of the third planetary gear set with the J-node.

9. The hybrid powertrain of claim 8, wherein a fourth one of the seven torque-transmitting devices selectively connects the ring gear member of the third planetary gear set with the planet carrier assembly member of the second planetary gear set.

10. The hybrid powertrain of claim 9, wherein a fifth one of the seven torque-transmitting devices selectively connects the planet carrier assembly member of the first planetary gear set with the J-node.

11. The hybrid powertrain of claim 10, wherein a sixth one of the torque-transmitting devices selectively connects an engine crankshaft of the internal combustion engine with the planet carrier assembly member of the second planetary gear set.

12. The hybrid powertrain of claim 11, wherein a seventh one of the torque-transmitting devices selectively connects the electric motor-generator and the sun gear member of the fifth planetary gear set with the engine crankshaft of the internal combustion engine, and an eighth one of the torque-transmitting devices selectively connecting the ring gear member of the fifth planetary gear set with a stationary component to selectively ground the electric motor-generator.

13. A hybrid powertrain comprising:
an internal combustion engine;
a multi-speed transmission having:
an input member;
an output member;
a first planetary gear set, a second planetary gear set, a third planetary gear set, a fourth planetary gear set, and a fifth planetary gear set each having a sun gear member, a planet carrier assembly member and a ring gear member;

a first interconnecting member continuously connects the sun gear member of the first planetary gear set with the sun gear member of the second planetary gear set;

a second interconnecting member continuously connecting the planet carrier assembly member of the first planetary gear set with the ring gear member of the fourth planetary gear set;

a third interconnecting member continuously connecting the ring gear member of the second planetary gear set with the sun gear member of the third planetary gear set;

a fourth interconnecting member continuously connecting the planet carrier assembly member of the fifth planetary gear set with the sun gear member of the first planetary gear set;

seven torque-transmitting devices configured to selectively interconnect the first planetary gear set, the second planetary gear set, the third planetary gear set, the fourth planetary gear set, and the fifth planetary gear set with one another in combinations of at least four to establish at least ten forward speed ratios and at least one reverse speed ratio between the input member and the output member; and a final drive mechanism continuously connected to the planet carrier assembly member of the fourth planetary gear set;

an electric motor-generator connected to the multi-speed transmission; and a final drive mechanism coupled to the output member.

14. The hybrid powertrain of claim 13, further comprising a fifth interconnecting member continuously connecting the electric motor-generator to the sun gear member of the fifth planetary gear set.

15. The hybrid powertrain of claim 14, further comprising a transmission housing, wherein a first one of the seven torque-transmitting devices selectively connects the ring gear member of the first planetary gear set with the transmission housing.

16. The hybrid powertrain of claim 15, wherein a second one of the seven torque-transmitting devices selectively connects the ring gear member of the second planetary gear set with a J-node.

17. The hybrid powertrain of claim 16, wherein a third one of the seven torque-transmitting devices selectively connects the planet carrier assembly member of the third planetary gear set with the J-node.

18. The hybrid powertrain of claim 17, wherein a fourth one of the seven torque-transmitting devices selectively connects the ring gear member of the third planetary gear set with the planet carrier assembly member of the second planetary gear set.

19. The hybrid powertrain of claim 18, wherein a fifth one of the seven torque-transmitting devices selectively connects the planet carrier assembly member of the first planetary gear set with the J-node.

20. The hybrid powertrain of claim 19, wherein a sixth one of the torque-transmitting devices selectively connects an engine crankshaft of the internal combustion engine with the planet carrier assembly member of the second planetary gear set, a seventh one of the torque-transmitting devices selectively connects the electric motor-generator and the sun gear member of the fifth planetary gear set with the engine crankshaft of the internal combustion engine, and an eighth one of the torque-transmitting devices selectively connecting the planet carrier assembly member of the fifth planetary gear set with a stationary component to selectively ground the electric motor-generator.

* * * * *